Dec. 29, 1925.
J. FERRO
TIRE ARMOR
Filed Nov. 5, 1924 2 Sheets-Sheet 1
1,567,720
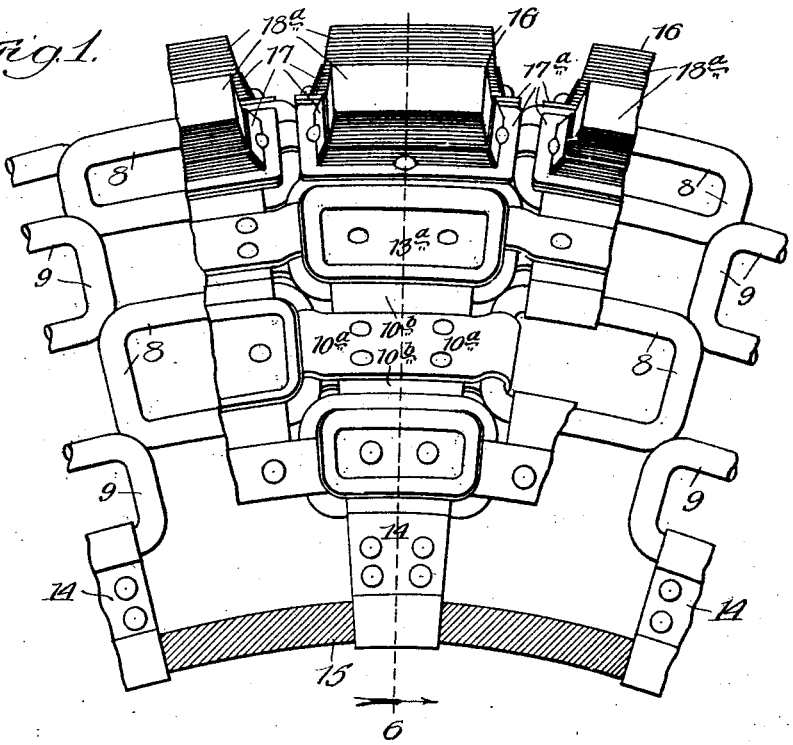
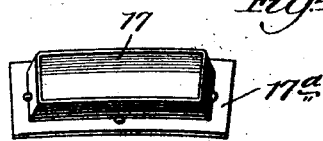
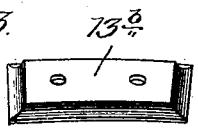
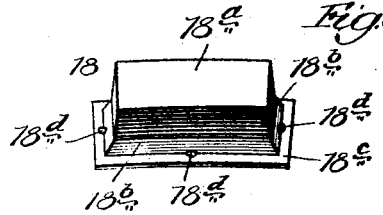

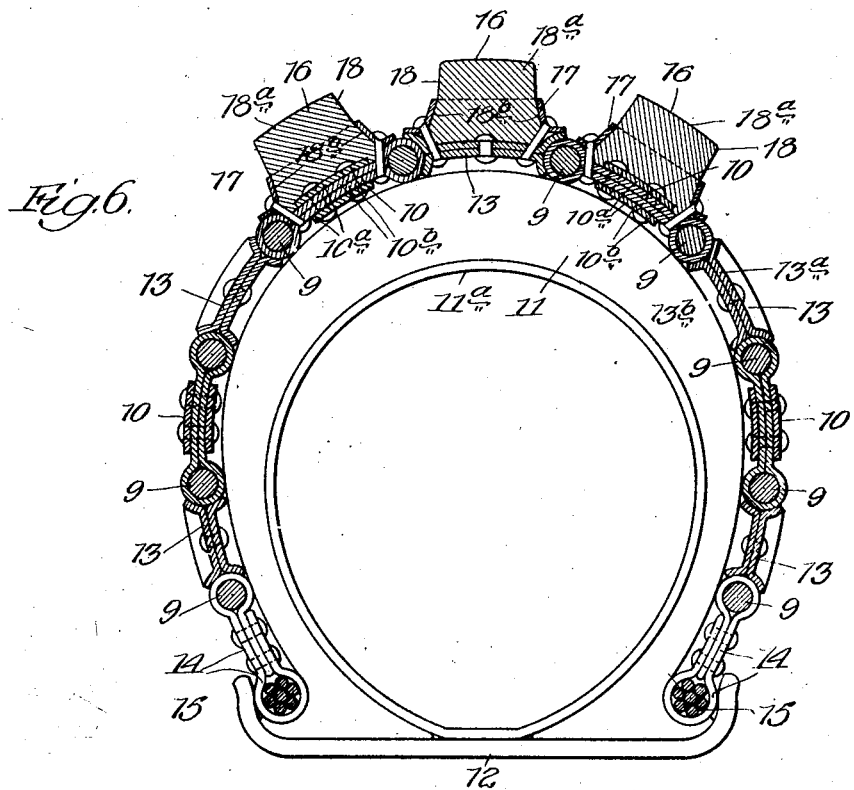
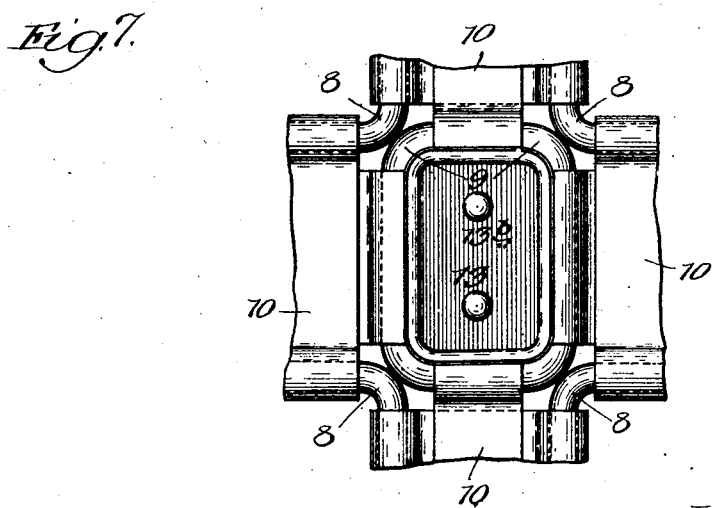

Patented Dec. 29, 1925.

1,567,720

UNITED STATES PATENT OFFICE.

JOSEPH FERRO, OF SPRINGFIELD, ILLINOIS.

TIRE ARMOR.

Application filed November 5, 1924. Serial No. 747,909.

*To all whom it may concern:*

Be it known that I, JOSEPH FERRO, a citizen of the United States, residing at Springfield, in the county of Sangamon and State of Illinois, have invented a new and useful Improvement in Tire Armors, of which the following is a specification.

My present invention is an improvement more especially for use on the armor of my Letters Patent, No. 1,518,171 dated December 9, 1924, to cushion it in the travel on the road of a tire armored therewith.

In the accompanying drawings—

Figure 1 is a broken view in elevation of the armor provided with my improved cushioning means;

Figures 2 and 3 are perspective views respectively of the lower and upper dished plates to form a pair affording a cover for each open link;

Figure 4 is a perspective view of the cushion-confining frame;

Figure 5 is a similar view of the rubber cushion adapted to be confined in the frame;

Figure 6 is a section on line 6—6, Fig. 1, showing the cushioned armor applied to a pneumatic tire on a wheel-rim, and Figure 7 is a broken plan view showing connected links with the cover applied to one thereof.

The armor of the illustrated construction comprises series of links, 8 and 9, extending transversely about its circumference, with the links in adjacent series in relatively staggered relation. Four-armed clips 10 interconnect the links throughout the armor by bending or looping the arms $10^b$ about adjacent sides of links 9 and the arms $10^a$ about those of links 8, and riveting together the mutually overlapping connector-arms, thus producing the flexibly united links in clusters.

To close the open links and thus, by filling the openings, to more completely protect the armored tire-casing 11 containing the inner tube $11^a$ on a wheel-rim 12, the links are provided with covers 13, each formed of a pair of dished plates $13^a$ and $13^b$, applied to embrace between their concave edges the bars of a link and being riveted together.

Loops 14 on the terminal links 8 of each series thereof, serve for stringing their tying means, represented as cables 15, for fastening the armor in place about the tire on a rim 12 by joining together the ends of each cable as by splicing.

In this connection it may be stated that to facilitate placing the armor, the rim 12 is transversely split, as stated in my said prior application, to adapt it to be separated and cause the ends to overlap one another, thus to reduce its diameter. Then with the casing covering the deflated inner tube and enveloped by the armor, the latter may be readily placed on the rim, as shown in Fig. 6, to be fastened, after bringing the rim-ends into abutting relation and prior to inflating the tube, by joining the ends of the cables 15.

For the purpose of my improvement, which consists in cushioning the tread-portion of the armor, I provide thereon a circumferential series of cushioning devices 16 of which three such series are represented in the drawings, namely one about the central portion of the armor-tread between the other two series.

Each cushioning device comprises a frame 17, preferably of the rectangular shape illustrated and formed with converging sides and a base-flange $17^a$, and a cushion 18 of rubber, or other suitable resiliently yielding material, having a tread-portion $18^a$ of the preferred rectangular shape shown in Fig. 5, a flaringly spreading extension $18^b$ to fit between the converging walls of the frame 17, and a base-flange $18^c$; whereby in introducing the cushion into its frame, from underneath the latter, the flange $18^c$ will abut against that of the frame, the extension $18^b$ will fit the converging frame walls, and the tread-portion $18^a$ will protrude beyond the frame.

In each circumferential series of the cushioning devices 16, the latter are shown to be alternately applied to the link-covers 13 and the link-connecting arms of the clips 10 intervening between successive covers; and the cushioning devices are securely fastened in place by rivets passing through the frames at the flanges $17^a$, the rubber cushions at holes $18^d$ therein (Fig. 5) and the alternating covers 13 and arms of the connectors 10.

By the described construction of the cushioning devices, the rubber cushions are securely held in their frames, which enable them to be rigidly attached to the armor to render easy-riding a tire equipped therewith.

I realize that considerable variation is possible in the details of construction of my improvement thus shown and described, and I do not intend to limit my invention thereto except as pointed out in the appended claim, in which it is my intention to claim all the novelty inherent in my invention as broadly as permissible by the state of the art.

I claim:

Tread-cushioning means for tire armor, comprising a frame having an endless outwardly tapering wall, a cushion protruding through said frame, said cushion having a tapering portion corresponding to and intimately fitting the inner surface of said wall, said frame having an outwardly extending base flange completely surrounding said wall, an outwardly extending base flange completely surrounding said cushion and disposed under the first-mentioned base flange, and a plurality of elements independent of each other to secure said frame and cushion together and to tire armor, said elements passing through said tapering portion.

JOSEPH FERRO.